US009191871B2

United States Patent
Miklos et al.

(10) Patent No.: US 9,191,871 B2
(45) Date of Patent: Nov. 17, 2015

(54) NODE ALLOCATION WITHIN A CORE NETWORK COMPRISING LOCAL POOL AREAS

(75) Inventors: Gyorgy Miklos, Üröm (HU); Szabolcs Malomsoky, Szentendre (HU); Gabor Toth, Szigetszentmiklós (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 826 days.

(21) Appl. No.: 12/446,022

(22) PCT Filed: Oct. 20, 2006

(86) PCT No.: PCT/EP2006/067643
§ 371 (c)(1),
(2), (4) Date: Mar. 23, 2010

(87) PCT Pub. No.: WO2008/046453
PCT Pub. Date: Apr. 24, 2008

(65) Prior Publication Data
US 2010/0323697 A1   Dec. 23, 2010

(51) Int. Cl.
*H04W 36/00* (2009.01)
*H04W 28/16* (2009.01)
*H04W 36/12* (2009.01)
*H04W 88/14* (2009.01)
*H04W 92/24* (2009.01)

(52) U.S. Cl.
CPC .............. *H04W 36/12* (2013.01); *H04W 28/16* (2013.01); *H04W 88/14* (2013.01); *H04W 92/24* (2013.01)

(58) Field of Classification Search
None
See application file for complete search history.

(56) References Cited

U.S. PATENT DOCUMENTS

| 6,408,182 | B1 | 6/2002 | Davidson et al. | |
| 2004/0203736 | A1* | 10/2004 | Serna | 455/426.1 |
| 2005/0054348 | A1* | 3/2005 | Turina et al. | 455/453 |
| 2005/0192005 | A1* | 9/2005 | Blom et al. | 455/432.1 |
| 2005/0281216 | A1* | 12/2005 | Varonen et al. | 370/328 |
| 2006/0193289 | A1* | 8/2006 | Ronneke et al. | 370/329 |
| 2008/0316980 | A1* | 12/2008 | Ahlen et al. | 370/338 |

FOREIGN PATENT DOCUMENTS

| WO | WO 2005/060297 A | 6/2005 | |
| WO | WO 2005060297 A1 * | 6/2005 | H04Q 7/38 |

OTHER PUBLICATIONS

3GPP TS 23.236 V6.1.0 (Sep. 2005) 3rd Generation Partnership Project; Technical Specification Group Services and System Aspects; Intra-domain connection of Radio Access Network (RAN) nodes to multiple Core Network (CN) nodes (Release 6).*

* cited by examiner

Primary Examiner — Kent Chang
Assistant Examiner — Benjamin Morales Fernande

(57) ABSTRACT

A method of allocating users to core network nodes of a cellular telecommunications System, where users access the core network via a radio access network and where the nodes of the core network are grouped into a plurality of local pool areas and the local pool areas are further grouped into one or more pool areas, and each local pool area corresponds to a geographic area covered by the access network. The method comprises allocating a user to a core network node of a local pool area corresponding to the geographic area within which the user is located, maintaining the core network node while the user moves within the local pool area, and, in the event that the user moves out of the local pool area but remains in the same pool area, maintaining said allocation at least temporarily.

8 Claims, 1 Drawing Sheet

Pool area

NODE ALLOCATION WITHIN A CORE NETWORK COMPRISING LOCAL POOL AREAS

TECHNICAL FIELD

The present invention relates to node allocation within a core network and more particularly to the allocation of core network nodes of a cellular telecommunications system to user terminals accessing the core network via a radio access network.

BACKGROUND

Cellular telecommunication systems are traditionally split into a radio access network part and a core network part. The access network is responsible for allocating radio resources to user terminals, and for managing these resources, depending on the radio access technology. The core network on the other hand includes functionality which is not dependant on the radio access technology being used.

In early GSM networks, only a single core network was provided. This network facilitated circuit switched calls, generally voice calls. The main component of the circuit switched core network is the Mobile Switching Centre (MSC) which provides exchange-type and mobility functionality in combination with Home Location Register (HLR) and Visitor Location Register (VLR). Later, a second core network was introduced to facilitate packet-switched data communication. This was the packet switched core network, i.e. GPRS core network. The main components of a GPRS core network are the Gateway GPRS Support Node (GGSN) which interconnects the access network to the IP world (e.g. the Internet or an IP backbone) and the Serving GPRS Support Node (SGSN) which is responsible for interconnection with the radio access network.

So-called third generation (3G) networks have introduced a new access network known as the UMTS Terrestrial Access Network (UTRAN) which offers significantly higher data transfer speeds than the GSM access network. The main components of the UTRAN are the node-B, which uses WCDMA as the radio transport technology, and the Radio Network Controller (RNC) which controls the node-B's and is responsible for radio resource management. The RNC interfaces the access network to the circuit switched core network through an MSC server and Media Gateway, and to the packet switched core network through the SGSN.

In current 2G and 3G networks, each node within a core network, e.g. MSC or SGSN, is responsible for a "service area" within the access network. Typically, a service area will comprise a plurality of access network nodes, e.g. BSCs (and BTSs) or RNCs (and node-Bs). When a user terminal roams within a service area it remains registered with the core network node responsible for that service area, regardless of whether or not the terminal crosses cell boundaries within the service area. However, when the terminal crosses a cell boundary that represents an inter-service area boundary, the terminal is transferred to the core network node responsible for the new service area. Each transfer results in core network updates as well as HLR updates.

In an effort to reduce network traffic associated with service area handovers, 3GPP has defined a so-called "Iu-flex" interface between access network and core network nodes, see 3GPP TS 23.236, Intra-domain connection of Radio Access Network (RAN) nodes to multiple Core Network (CN) nodes both in the control plane and in the user plane. This interface provides for the flexible allocation of core network nodes to access network nodes and introduces the concept of "pool-areas". A pool area is similar to a service area insofar as it encompasses a set of access network nodes (typically within a common geographical area). However, a service area can be associated with more than one core network node, e.g. MSC or SGSN. User terminals are allocated to core network nodes within the same pool area according to some unspecified algorithm. This could be based upon load sharing. Pool areas may be contiguous or may be overlapping to a greater or lesser extent.

As a user moves across a pool area, he remains registered with the same core network node, regardless of his geographical location with respect to that node. Thus, update related traffic within the core network is avoided. When the user crosses a pool area boundary, he is transferred to a core network node within the new pool area.

As well as reducing core network update traffic, the pool area concept introduces a degree of redundancy into the system architecture as, if one core network node fails, users can be dynamically re-assigned to an alternative node. Furthermore, capacity within a pool area can be easily upgraded (or even downgraded) by adding (or taking away) core network nodes.

It is likely that future generations of cellular networks will include the concept of pool areas. For example, 3GPP TR 23.882, System Architecture Evolution: Report on Technical Options and Conclusions, discusses this architecture in the context of the System Architecture Evolution (SAE) network. In theory at least, the larger a pool area is, the more efficient it will be at decreasing core network traffic. However, in the case of large countries, a single operator's network may span several thousand kilometers and a pool area that large can result in users being allocated to extremely remote core network nodes, introducing tens of milliseconds of delay between the core network node and the user. This can be a problem in the control plane, as the path between the user and the core network node might be traversed multiple times in a control procedure, increasing the latency of the control procedures. In the user plane, large distances between the user and a user plane node within the core network could lead to high transport costs. In the absence of any alternative solution, large pool areas will be avoided.

SUMMARY

It will be appreciated from the above discussion that it is desirable to allocate a core network node, whether in the control plane or in the user plane, to a user that is as geographically close to the user as possible. Of course, other considerations may tend to move the core node further away than is entirely optimal, e.g. overload of the geographically closest node.

According to a first aspect of the present invention there is provided a method of allocating users to core network nodes of a cellular telecommunications system, where users access the core network via a radio access network and where the nodes of the core network are grouped into a plurality of local pool areas and the local pool areas are further grouped into one or more pool areas, and each local pool area corresponds to a geographic area covered by the access network, the method comprising:

allocating a user to a core network node of a local pool area corresponding to the geographic area within which the user is located;

maintaining the core network node while the user moves within the local pool area; and in the event that the user moves out of the local pool area but remains in the same pool area, maintaining said allocation at least temporarily.

The present invention ensures that an initial allocation of a user to a core network results in the two entities being relatively close to each other. On the other hand, when a user does roam outside of the initial local pool area, handover to a new pool area is not required, avoiding the necessity for update traffic at that stage. However, as the vast majority of cellular network users move only a few miles over quite prolonged periods, such handovers will be rare. At the same time, the advantage of a large pool area, namely load balancing, redundancy, ease of upgrade, etc, are retained.

The core network nodes may be control plane nodes, e.g. MSCs, SGSNs, MMEs, etc. Alternatively, the nodes may be user plane nodes, e.g. UPEs, MG, etc.

The method may comprise maintaining said allocation, following a user move out of said local pool area but remaining in the same pool area, for a predefined time, before transferring the user to a core network node within the local pool area responsible for the new geographic area. Alternatively, the user may be transferred following a pre-defined period of inactivity on the part of the user.

According to a second aspect of the present invention there is provided a method of allocating users to core network nodes of a cellular telecommunications system, where users access the core network via a radio access network and where the nodes of the core network are grouped into a plurality of local pool areas and local pool areas are further grouped into one or more pool areas, and each local pool area corresponds to a geographic area covered by the access network, the method comprising:

attempting allocation of a user to a core network node of a local pool area corresponding to the geographic area within which the user is located; and in the event that the allocation attempt fails, re-allocating the user to another core network node within the same pool area.

Preferably, the re-allocation is attempted first to a core network node in the same local pool area, and if that fails to a core network node within the same pool area but different local pool area.

According to a third aspect of the present invention there is provided a node for use in a telecommunications network where users access a core network via a radio access network and where the nodes of the core network are grouped into a plurality of local pool areas and local pool areas are further grouped into one or more pool areas, and each local pool area corresponds to a geographic area covered by the access network, the node comprising:

means for re-allocating a user, allocated to the node, to a node within another local pool area, when the user moves out of the current local pool area into that other local pool area.

It will be appreciated that the allocation control node may be one of the core network nodes which can be allocated, or a separate node, for example a radio access network node.

Said means for re-allocating a user may comprise means for performing a re-allocation after a pre-defined time period has elapsed since the user moved into the new local pool area. Alternatively, said means for re-allocating a user may comprise means for performing a re-allocation after a pre-defined time period of inactivity on the part of the user has elapsed, following movement into the new local pool area.

DETAILED DESCRIPTION

Figure 1:
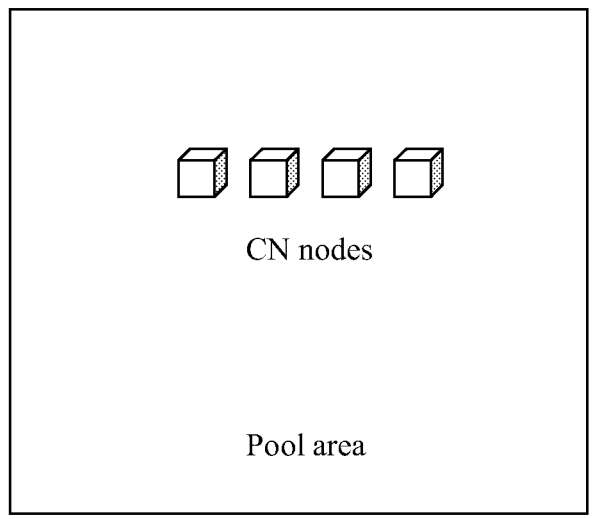
FIG. 1 illustrates schematically a generic cellular telecommunications system comprising a radio access network and a core network organised as a pool area.
Figure 2:
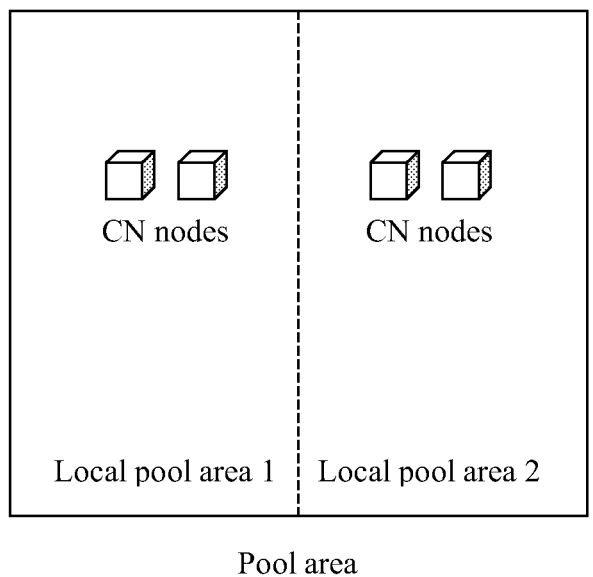
FIG. 2 illustrates schematically a cellular telecommunications system in which a pool area is divided into local pool areas.

FIG. 2 illustrates schematically a cellular telecommunications system which has a defined coverage area. In the case of a national operator, this area may be defined by the international borders of a country. Within the coverage area, one or more pool areas is defined. Where multiple pool areas exist, these may be contiguous and/or overlapping. A pool area is associated with a set of access network and core network nodes of within an operator's network. Each pool area is divided into multiple "local" pool areas (in FIG. 2 only two local pool areas are shown but any appropriate number of local pool areas can be defined) where each local pool area covers a corresponding sub-area of the overall network coverage area.

Each local pool area is associated with one or more core network (CN) nodes, and each can serve the whole pool area, i.e., not only the local pool area. [Access network nodes are not shown in the Figure]. However, users (referred to hereinafter as User Equipment or UE) in local pool area 1 have a preference to select and use CN nodes in local pool area 1, whilst UEs in local pool area 2 have a preference to select and use CN nodes in local pool area 2. Below, a number of schemes are presented that can be employed to give preference, during an initial allocation, to the CN nodes in the same local pool area as a UE whilst minimising the need for changes to existing standards.

Initial Local CN Node Selection

According to this first scheme, when a UE enters the pool area (i.e., attaches or is handed over from another pool area in if there are multiple pool areas), a CN node is selected from the local pool area where the UE is currently located. The CN node can be maintained while the UE is anywhere within the whole pool area, i.e., even when the UE moves to another local pool area in the same pool area.

It can be expected that UEs will leave the local pool area very infrequently (assuming that local pool areas are sufficiently large and are defined taking into account typical moving patterns). Consequently, this scheme is beneficial because it decreases the average distance between the CN node and the UE since most of the time these entities will be within the same local pool area. At the same time, the number of CN node changes is small, as the CN node is not changed even if the UE does move to another local pool area in the same pool area.

A special case of this scheme is when there is only one CN node present in a local pool area, in which case the scheme will of course select the CN node closest to the UE. When there is more than one CN node in the local pool area, the selection can be based on load balancing, i.e., using a weighted round robin scheme according to the CN node capacities.

CN Node Re-Selection

This can be used as an add-on to the initial local CN node selection scheme. When the UE moves out of the local pool area where the initially allocated CN node is located, a CN node within the new local pool area can be selected, i.e., a handover of the CN node can be performed. However, this does not need to take place immediately when the UE crosses the border between the local pool areas. Rather, it can be done using "soft" thresholds. For example, CN node re-selection can be performed only after some predefined time period has elapsed or only after the UE has been inactive for a predefined period of time.

Forwarding CN Node Selection Messages

According to this scheme, the initial message to select a CN node for a user is forwarded from one CN node to another CN node such that, if possible, the latter CN node serves the UE rather than the first one. For example, if the load at a first CN node is too high, that CN node selects another CN node in the same local pool area and forwards the initial message to that CN node which responds to the UE. The UE may be unaware of the forwarding of the message. Note also that multiple forwarding operations may be performed. If no CN node is available in the local pool area, the message may be forwarded to a CN node outside of the local pool area but within the same pool area. In order to avoid overloading a given local pool area, rather than look first within the local pool area, a CN node may be selected initially from anywhere across the entire pool area. Indeed, given that a forwarded message indicates a high load within the local pool area, the local pool area may be excluded when selecting a CN node for forwarding purposes.

An alternative CN node may be selected according to a weighted round robin scheme taking into account all CN nodes in the pool area (or local pool area). Yet another approach is to acquire load information about the other CN nodes (e.g., with the help of a network management mechanism that collects load information), and then select the CN node with the least relative load. Alternatively, CN nodes having their loads below a threshold value can be identified, and one of these nodes selected to receive the forwarded message. Alternatives employing a combination of load, capacity and location information, and possibly other operator preferences, may also be used.

It will be appreciated that a modification to these (forwarding) schemes is that, rather than directly forwarding the selection message from one CN node to another, the first CN node could send back a response to the originator of the message identifying a second, alternative CN node. The originator then sends the selection message to the second CN node.

The schemes discussed above apply to CN node selection in the control plane, e.g., for the Mobility Management Entity (MME) according to SAE parlance. It is also possible however to apply them also in the user plane, e.g., for the User Plane Entities (UPE). In the user plane, criteria for making a node selection might include node functionality (e.g. whether or not a given user plane node supports non-3GPP access) and characteristics (e.g., whether or not a given user plane node can serve high bandwidth users). These may be applied to pre-select user plane CN nodes, prior to a final selection according to load balancing.

The same pool areas may be defined for the control plane and the user plane. However, the local pool areas can be defined separately for the user and control planes. In particular, more local pool areas could be defined in the user plane, as in the user plane, localisation can be more important in order to save transport costs.

On the other hand, it is possible to define different pool areas in the control plane and in the user plane. For example, it is possible to use larger pool areas in the user plane together with more local pool areas to ensure allocation of a more local CN node in the user plane, whilst using smaller pool areas and no local pool areas in the control plane such that the distances between UEs and the control plane CN nodes are not large. N.B. smaller pool areas in the control plane are possible since CN node relocation in this plane is easier than in the user plane.

It will be appreciated by the person of skill in the art that various modifications may be made to the above described embodiments without departing from the scope of the present invention.

The invention claimed is:

1. A method of allocating user equipments (UEs) to core network nodes of a cellular telecommunications system, wherein UEs access the core network via a radio access network and wherein the nodes of the core network are grouped into a plurality of local pool areas and local pool areas are further grouped into one or more pool areas, each local pool area corresponding to a geographic area covered by the access network, the method comprising:
    attempting allocation of a UE to a core network node of a local pool area corresponding to the geographic area within which the UE is located;
    in the event that the allocation attempt fails, first attempting to re-allocate the UE to another core network node within the same local pool area; and
    if the first re-allocation attempt fails, attempting to re-allocate the UE to a core network node within the same pool area but different local pool area.

2. The method according to claim 1, wherein said core network nodes are one of the following: Mobile Switching Centers (MSCs), Serving GPRS Support Nodes (SGSNs), Mobility Management Entities (MMEs), User Plane Entities (UPEs) and Media Gateways (MGs).

3. The method according to claim 1, wherein said attempt at allocating a user to a core network node comprises sending an allocation notification from an allocation control node to the core network node, and returning from the core network node to the allocation control node an allocation rejection notification, said step of re-allocating the user to another core network node comprising sending a new allocation notification from the allocation control node to said another core network node.

4. The method according to claim 1, wherein said attempt at allocating a user to a core network node comprises sending an allocation notification from an allocation control node to the core network node, and said step of re-allocating the user to another core network node comprises sending a new allocation notification from the core network node to the another core network node.

5. The method according to claim 1, wherein the local pool areas include local control plane pool areas that are defined separately from local user plane pool areas.

6. The method according to claim 5, wherein the local control plane pool areas are smaller than the local user plane pool areas.

7. A node in a telecommunications network where user equipments (UEs) access a core network via a radio access network and nodes of the core network are grouped into a plurality of local pool areas and local pool areas are further grouped into one or more pool areas, each local pool area corresponding to a geographic area covered by the access network, the node comprising:
    an allocation unit configured to allocate a UE to the node, the node being one of a core network node and a radio access network node of a local pool area corresponding to the geographic area within which the UE is located;
    a re-allocation unit configured to re-allocate the UE previously allocated to the node to another node within the same local pool area if an allocation attempt fails,
    wherein, the re-allocation unit is further configured to re-allocate the UE to a node within the same pool area but different local pool area if a first re-allocation attempt fails.

8. The node according to claim 7, wherein said nodes of the core network are one of the following: Mobile Switching Centers (MSCs), Serving GPRS Support Nodes (SGSNs), Mobility Management Entities (MMes), User Plane Entities (UPEs) and Media Gateways (MGs).

\* \* \* \* \*

UNITED STATES PATENT AND TRADEMARK OFFICE
CERTIFICATE OF CORRECTION

PATENT NO. : 9,191,871 B2  
APPLICATION NO. : 12/446022  
DATED : November 17, 2015  
INVENTOR(S) : Miklos et al.

Page 1 of 1

It is certified that error appears in the above-identified patent and that said Letters Patent is hereby corrected as shown below:

Claims
In Column 7, Line 4, in Claim 8, delete "(MMes)," and insert -- (MMEs), --, therefor.

Signed and Sealed this
First Day of March, 2016

Michelle K. Lee
*Director of the United States Patent and Trademark Office*